(12) United States Patent
Camery

(10) Patent No.: US 11,604,898 B2
(45) Date of Patent: Mar. 14, 2023

(54) SECURE ONLINE COLLABORATION

(71) Applicant: Google LLC, Mountain View, CA (US)

(72) Inventor: Luke Ernest Camery, New York, NY (US)

(73) Assignee: Google LLC, Mountain View, CA (US)

( * ) Notice: Subject to any disclaimer, the term of this patent is extended or adjusted under 35 U.S.C. 154(b) by 219 days.

(21) Appl. No.: 16/546,017

(22) Filed: Aug. 20, 2019

(65) Prior Publication Data

US 2021/0056233 A1 Feb. 25, 2021

(51) Int. Cl.
  *G06F 21/62* (2013.01)
  *H04L 9/08* (2006.01)
  *H04L 9/40* (2022.01)

(52) U.S. Cl.
  CPC ........ *G06F 21/6272* (2013.01); *H04L 9/0822* (2013.01); *H04L 63/0428* (2013.01)

(58) Field of Classification Search
  CPC ............... G06F 21/6272; H04L 9/0822; H04L 63/0428
  See application file for complete search history.

(56) References Cited

U.S. PATENT DOCUMENTS

| | | | |
|---|---|---|---|
| 8,321,688 B2 | 11/2012 | Auradkar et al. | |
| 9,590,958 B1 | 3/2017 | Howell | |
| 10,007,809 B1 * | 6/2018 | Douglis | H04L 9/0894 |
| 2006/0133617 A1 * | 6/2006 | Minamizawa | H04L 9/0891 |
| | | | 380/286 |
| 2012/0185759 A1 * | 7/2012 | Balinsky | G06Q 10/103 |
| | | | 715/209 |
| 2013/0007464 A1 * | 1/2013 | Madden | H04L 63/061 |
| | | | 713/179 |
| 2013/0159695 A1 * | 6/2013 | Chiueh | G06F 21/6227 |
| | | | 713/150 |

(Continued)

OTHER PUBLICATIONS

Wikipedia, "Key Wrap" Oct. 24, 2016 (Oct. 24, 2016). XP055733906, Retrieved from the Internet: URL: https://en.wikipedia.org/w/index.php?title=Key_Wrap&oldid=745981622, [retrieved on Sep. 25, 2020], 2 pages.

(Continued)

*Primary Examiner* — Kristine L Kincaid
*Assistant Examiner* — Alexander R Lapian
(74) *Attorney, Agent, or Firm* — Lowenstein Sandler LLP

(57) ABSTRACT

A method for secure online collaboration is provided. The method includes receiving, at a server of a cloud-based storage system, first encrypted data from a first client device. The cloud-based storage system stores a plurality of documents in an encrypted form. The method also includes determining a document of the plurality of documents that is associated with the first encrypted data. The document is not accessible to the server in a decrypted form. The first encrypted data represents an edit to a portion of the document. The method further includes determining a plurality of user accounts of collaborators of the document. The plurality of user accounts includes a first user account associated with the first client device. Moreover, the method includes providing the first encrypted data to one or more other client devices that are each associated with one of the plurality of user accounts, excluding the first user account.

20 Claims, 7 Drawing Sheets

(56) References Cited

U.S. PATENT DOCUMENTS

| | | | |
|---|---|---|---|
| 2014/0115332 A1* | 4/2014 | Crosbie | G06F 21/6218 |
| | | | 713/167 |
| 2015/0312227 A1* | 10/2015 | Follis | H04L 63/126 |
| | | | 713/176 |
| 2017/0070506 A1* | 3/2017 | Reddy | G06F 21/56 |
| 2018/0048464 A1* | 2/2018 | Lim | H04L 63/061 |
| 2018/0062852 A1* | 3/2018 | Schmahmann | H04L 9/14 |

OTHER PUBLICATIONS

Wikipedia, "Collaborative real-time editor" Aug. 7, 2019 (Aug. 7, 2019), XP055733909, Retrieved from the Internet URL: https://en.wikipedia.org/w/index.php?title=Collaborative_real-time_editor&oldid=909827932, [retrieved on Sep. 25, 2020], 4 pages.

PCT International Search Report and Written Opinion for International Application No. PCT/US2020/047108, dated Oct. 6, 2020 16 pages.

Zimmerman, Jonathan, "End-to-End Encryption (E2EE) for Dropbox, Google Drive and Co.," https://www.boxcryptor.com/en/blog/post/end-to-end-encryption-e2ee-for-dropbox-google-drive-and-co/, Jun. 13, 2019, 2 pages.

* cited by examiner

SECURE ONLINE COLLABORATION

TECHNICAL FIELD

Aspects and implementations of the present disclosure relate to online collaboration using cloud-based content management platform, and more specifically, relate to secure online collaboration.

BACKGROUND

During online collaboration, users utilize various collaborative tools provided by a cloud-based content management platform over a network to work together. The collaborative tools include, for example, document processing applications (e.g. word processing application, presentation slide application, and spreadsheet application), a document storage, an online calendar, an email, a messenger, etc. Accordingly, users in such collaborative environment would edit and comment on documents and respond to any feedback from other users over the network to accomplish a goal.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for providing secure online collaboration. In an implementation, first encrypted data is received from a first client device at a first server of a cloud-based storage system that stores a plurality of documents in an encrypted form. A document of the plurality of documents that is associated with the first encrypted data is determined at the first server, where the document is not accessible to the first server in a decrypted form, and where the first encrypted data represents an edit to a portion of the document. The first server cannot access the document in a decrypted form since it is not permitted to decrypt the document, stored at the cloud-based storage system in an encrypted form. E.g., the first server has no access to data required for the encryption of the document. A plurality of user accounts of collaborators of the document is determined at the first server, where the plurality of user accounts comprises a first user account associated with the first client device. The first encrypted data is provided by the first server to one or more other client devices that are each associated with one of the plurality of user accounts, excluding the first user account.

In another implementation, a graphical user interface (GUI) for online collaborative editing of a document is provided in association with a first server of a cloud-based storage system. An edit to a portion of the document is received via the GUI. Encrypted data is generated, where the encrypted data represents the edit and includes the edit encrypted based on a data encryption key, and the data encryption key encrypted based on a key encryption key provided by a second server. The encrypted data is provided to the first server of the cloud-based storage system.

The subject matter, summarized above and described below in more detail, enables a more secure document management at a cloud-based storage system, e.g., a cloud-based content management platform, as it is not capable to decrypt documents stored at the cloud-based storage system, e.g., a cloud-based content management platform. The users/collaborators may provide their encrypted documents to the cloud-based storage system/cloud-based content management platform without concerns on whether or not contents of the documents may become available to further users that are not collaborators of the documents and moreover, are not permitted to receive knowledge on the contents of the documents. Thus, a more confidential implementation of the cloud-based storage system/cloud-based content management platform is enabled.

Moreover, a transparent and efficient encryption key management is implemented. It uses as less resources as possible. Further, it achieves and supports the reliable and confidential implementation of the cloud-based storage system/cloud-based content management platform. The transparency is given, e.g., in that clear and verifiable responsibilities for handling key data are defined and present. The efficiency is given, e.g., in that as less as possible components and as less as possible communications are involved for ensuring the confidential and reliable storage of encrypted documents at the cloud-based storage system/cloud-based content management platform. The minimizing of the amount of involved components and communications increase the security and the reliability as vulnerable points for inadmissible and unauthorized detecting data required for encryption are reduced.

The subject matter described herein is not limited to the above exemplary listed advantages. Further advantages are achievable and recognizable in view of the disclosure of the present application.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
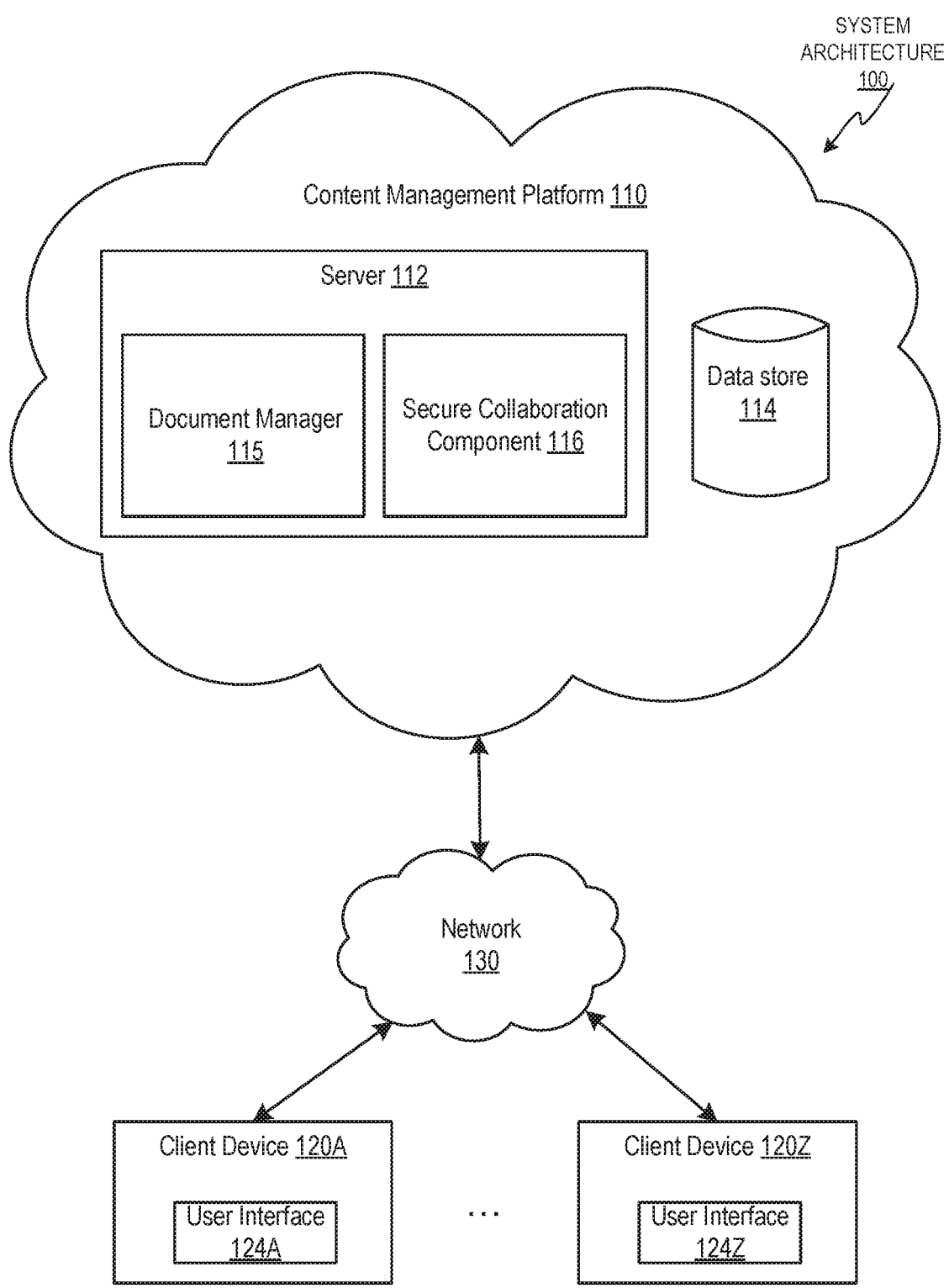
FIG. 1 illustrates an example of a system architecture for implementations of the present disclosure.

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

A cloud-based content management platform provides collaborative tools such as document processing applications, a document storage, an online calendar, a communication applications, among other things. Accordingly, collaborators can concurrently edit a document and view contributions of other collaborators over the network based on the cloud-based content management platform. A "collaborator" used herein refers to a user having a user account assigned a right to access (e.g., view and/or edit) a document using the cloud-based content management platform. However, such online collaborative editing of a document is currently vulnerable to interference or interception by entities other than a sender and one or more recipients (i.e., entities other than intended collaborators). Due to network-based communications between various collaborators making edits to a document, content of the document including the edits by the collaborators may be susceptible to a security breach. Thus, the current cloud-based content management platform has a technical problem of lacking a protection mechanism for contents of documents from entities other than the respective collaborators.

Aspects and implementations of the present disclosure address the above and other deficiencies or problems by supporting exchange of document edits in an encrypted form among collaborators without allowing access to the edits in a decrypted form at a server of cloud-based content management platform. For example, documents can be stored at the cloud-based content management platform in an encrypted form, and the server of the cloud-based content management platform may not be able to decrypt the documents (i.e., the documents may not be accessible to the server in a decrypted form). During the exchange of document edits between collaborators, the server can receive encrypted data from a client device of a collaborator and can determine which document is associated with the received encrypted data. The server can then determine which user accounts are associated with the document (i.e., user accounts of collaborators of the document). The user accounts can include a user account associated with the client device that sent the encrypted data to the server. Further, the server can provide the encrypted data to one or more other client devices that are each associated with one of the user accounts, excluding the user account associated with the client device that sent the encrypted data to the server.

Some technical advantages of implementations of the present disclosure include enhancing data security of contents (including edits) of documents as they are received from client devices of collaborators and as they are being stored using the cloud-based content management platform.

FIG. 1 illustrates an example of a system architecture 100 of a cloud-based storage system for implementations of the present disclosure.

The system architecture 100 includes a cloud-based content management platform 110 connected to client devices 120A-120Z via a network 130. The cloud-based content management platform 110 refers to a collection of physical machines that host applications providing one or more services (e.g., content management) to multiple client devices 120A-120Z via a network 130. The network 130 can be public networks (e.g., the Internet), private networks (e.g., a local area network (LAN) or wide area network (WAN)), or a combination thereof. The network 130 can include a wireless infrastructure, which can be provided by one or more wireless communications systems, such as a wireless fidelity (WiFi) hotspot connected with the network 130 and/or a wireless carrier system that can be implemented using various data processing equipment, communication towers, etc. Additionally or alternatively, the network 130 can include a wired infrastructure (e.g., Ethernet).

The cloud-based content management platform 110 can include a server 112 and a data store 114. The data store 114 can be separate from the server 112 and communicatively coupled to the server 112, or the data store 114 can be part of the server 112. In some implementations, the data store 114 can be included as part of the client devices 120A-120Z. The data store 114 can store data associated with various collaboration tools including a document processing application, an online calendar, and communication tools such as email and messaging tools. Moreover, the data store 114 can store various types of documents in an encrypted form. Examples of document types include slide presentations, text documents, spreadsheets, or any types of electronic documents (e.g., electronic documents including text, tables, videos, images, graphs, slides, charts, software programming code, designs, lists, plans, blueprints, maps, etc.). These documents can be concurrently edited by collaborators. The data store 114 can also store any identifying information (e.g., a document identifying information such as a name of the document, a user identifying information such as 'username@domain.com') and timestamps associated with the documents.

The server 112 can represent one or more physical machines (e.g., server machines, desktop computers, etc.) that include one or more processing devices communicatively coupled to memory devices and input/output (I/O) devices. The server 112 can host a document manager 115.

The document manager 115 can be implemented as computer instructions that are executable by one or more processing devices on the server 112. In alternative implementations, the document manager 115 can be installed on the client devices 120A-120Z (e.g., as a standalone application) and operate as peers in a peer-to-peer environment. In yet alternative implementations, applications on the client devices 120A-120Z can interact with the document manager 115 and can perform some of the functionality of the document manager 115.

In an implementation, the document manager 115 can provide user interfaces (UIs) 124A-124Z, which can be communicated to the client devices 120A-120Z as web pages to be rendered by a web browser and displayed on the client device 120A-120Z in a web browser window. In another implementation, the UIs 124A-124Z can be provided by a mobile application or a desktop application. For example, the UIs 124A-124Z can be displayed by a native application executing on the client device 120A-120Z. The native application can be separate from a web browser.

The server 112 can include a secure collaboration component 116 to provide secure environment for online collaborative editing of a document. The secure collaboration component 116 enables a client device 120A-120Z to securely perform collaborative actions (e.g., editing) to documents. In particular, the secure collaboration component 116 can receive encrypted data from a client device 120A-120Z of a collaborator and distribute such encrypted data to other client devices 120A-120Z of collaborator(s), without having access to decrypted content of the encrypted data.

For example, the secure collaboration component 116 receives encrypted data that represents an edit to a portion of a document. The encrypted data can include an encrypted edit and encrypted key. The encrypted edit corresponds to the edit encrypted using a data encryption key. The encrypted key corresponds to the data encryption key encrypted or wrapped using a key encryption key. Because the data encryption key is encrypted using the key encryption key and the server 112 (i.e., processing device of the server 112) does not have access to the key encryption key, the server 112 cannot decrypt the (encrypted) edit. Consequently, the server 112 cannot access any portion of the document in a decrypted form.

Upon receiving the encrypted data, the secure collaboration component 116 can determine a document associated with the encrypted data and user accounts of collaborators of the document. In one implementation, the secure collaboration component 116 can assign to a user account of a collaborator a master or collaboration manager role. The collaboration manager role can involve coordinating the online collaborative editing with the secure collaboration component 116 by ensuring that every collaborator has access to the same or substantially the same version of the document. Depending on whether the encrypted data is received from a client device 120A-120Z that is associated with the collaboration manager role, the secure collaboration component 116 can determine which different client device(s) 120A-120Z the encrypted data should be forwarded to.

For example, when the secure collaboration component 116 receives encrypted data from a client device 120A-120Z not associated with the collaboration manager role, the secure collaboration component 116 can route the encrypted data to a client device 120A-120Z associated with the collaboration manager role. In response to receiving a plurality of encrypted data form the secure collaboration component 116, the client device 120A-120Z associated with the collaboration manager role can consolidate edits (after decrypting the encrypted data) made by collaborators into encrypted data that is sent to the secure collaboration component 116. The secure collaboration component 116 then distributes the encrypted data received from the client device 120A-120Z associated with the collaboration manager role to other collaborators.

In some implementations, the secure collaboration component 116 of server 112 can interact with document manager 115 to provide implementations of the disclosure. Further aspects of the secure collaboration component 116 are described in more detail below with respect to FIGS. 2A and 2B.

The client devices 120A-120Z can include one or more processing devices communicatively coupled to memory devices and I/O devices. The client devices 120A-120Z can be desktop computers, laptop computers, tablet computers, mobile phones (e.g., smartphones), or any suitable computing device. As discussed above, the client devices 120A-120Z can each include a web browser and/or a client-based application that runs in a web browser using HTML and JavaScript code. Also, the client devices 120A-120Z can each include other client applications such as a mobile application or a desktop application. In one implementation, the client devices 120A-120Z can each store a local version (or a document model) of a document(s) associated with the respective user account. The local version of the document can reflect edits made by collaborators (including the respective user) since the creation of the document until the last time the respective user accessed the document. The local version cannot be accessed by the server 112.

In one implementation, the client device 120A-120Z enables secure online collaboration in association with the secure collaboration component 116 of the server 112. The client device 120A-120Z can present a GUI 124A-124Z for online collaborative editing of a document via the web browser or the client application. The client device 120A-120Z can generate encrypted data representing an edit to a portion of the document to the server 112 to be shared with other collaborator(s). Examples of the edit or mutation can include a keystroke(s) in a portion (at a particular index or location) of the document and an icon or menu selection changing a format of text in a portion of the document.

The client device 120A-120Z also receives such encrypted data from the server 112, decrypts the encrypted data, and updates the document (i.e., a local version of the document stored in the client device 120A-120Z) based on the decrypted data. During the encryption and decryption of the edit, the client device 120A-120Z does not expose the edit in a decrypted form to any other devices (including the server 112). For example, the client device 120A-120Z generates a data encryption key and encrypts an edit using the data encryption key. The client device 120A-120Z further communicates with another server that is independent of and not connected to the server 112 to encrypt or wrap the data encryption key without exposing the edit in a decrypted form. Then the client device 120A-120Z provides the encrypted data including the encrypted edit and encrypted key to the server 112 that does not have access to the data encryption key used to encrypt the data or the key encryption key used to encrypt or wrap the data encryption key. Further details of the client device 120A-120Z is described below with respect to FIGS. 2A and 2B.

Figure 2A:
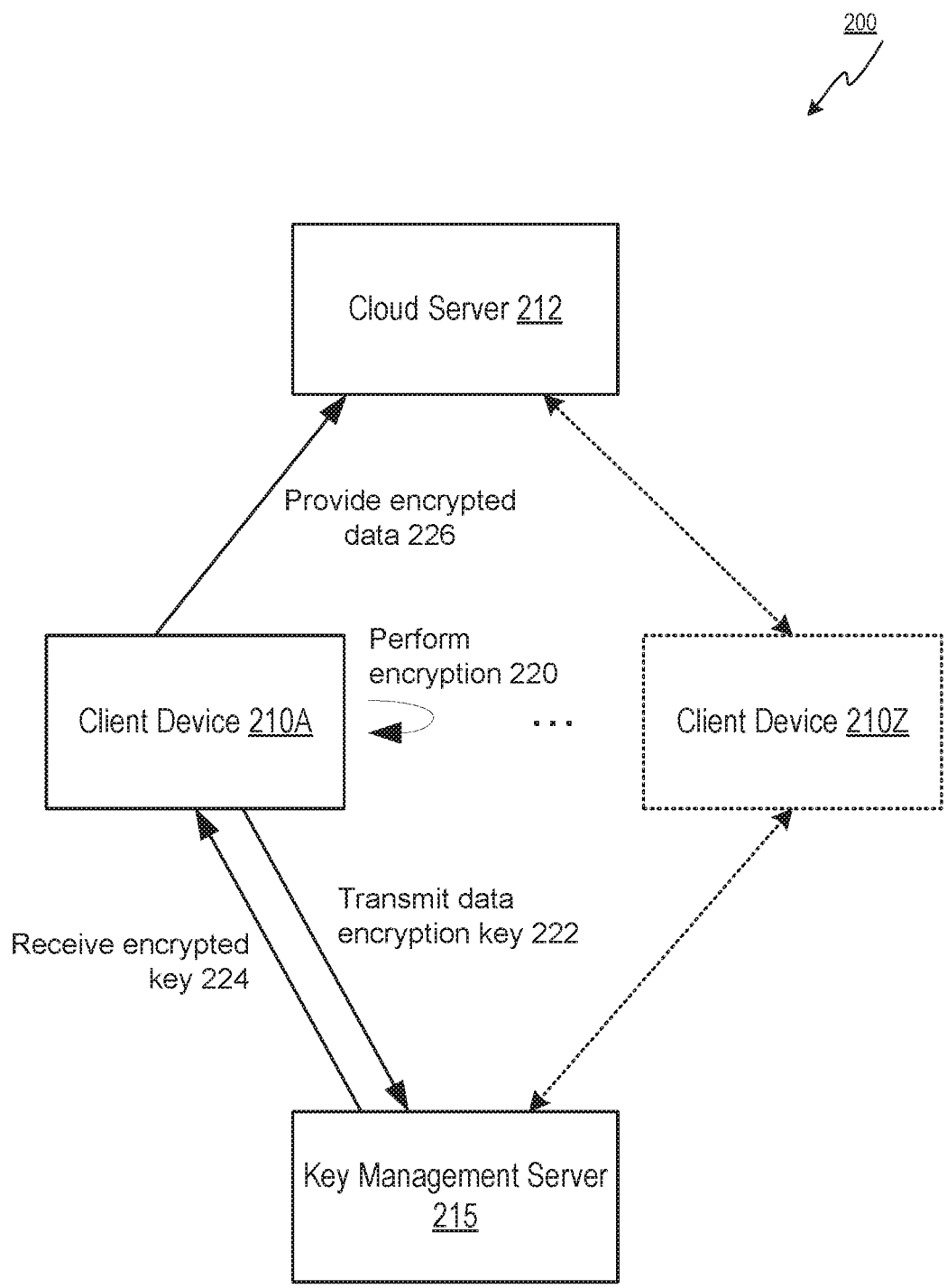
FIG. 2A depicts an example of a system architecture for providing secure collaborative editing of a document, in accordance with one implementation of the disclosure.

FIG. 2A depicts an example of a system architecture 200 for providing secure collaborative editing of a document, in accordance with one implementation of the disclosure.

The system architecture 200 includes client devices 210A-210Z, a cloud server 212, and a key management server 215. The client devices 210A-210Z are connected with the cloud server 212 and the key management server 215, while the cloud server 212 and the key management server 215 are not connected to each other. The cloud server 212 corresponds to the server 112 of the FIG. 1. Accordingly, the cloud server 212 stores documents in an encrypted form for user accounts associated with the cloud-based storage system. The key management server 215 is a server that manages encryption (or wrapping) and decryption (or unwrapping) of a data encryption key for the client device 210A-210Z. The data encryption key is used to encrypt and decrypt data (e.g., document edits).

Similar to client devices 120A-120Z of FIG. 1, a client device 210A-210Z includes one or more processing devices that enable a user to collaboratively edit a document in a secure online environment. That is, the user can securely share edits with other collaborators and securely receive edits made by other collaborators without exposing the edits in a decrypted form to the cloud server 212 and the key management server 215, as will be described with respect to operations 220 to 226.

At operation 220, the client device 210A-210Z performs encryption. For example, the client device 210A-210Z can receive an edit to a portion of the document via a graphical user interface (GUI) for online collaborative editing of a document on a web browser of the client device 210A-210Z. Examples of the edit or mutation can include a keystroke(s)

in a portion (at a particular index or location) of the document and an icon or menu selection changing a format of text in a portion of the document. In response, the client device 210A-210Z generates a data encryption key and uses the data encryption key to encrypt the edit received. The client device 210A-210Z can generate the data encryption key according to the Advanced Encryption Standard (AES). The data encryption key can be at a length of, for example, 256 bits. The data encryption key can also be used to decrypt the encrypted edit. The client device 210A-210Z can generate the data encryption key based on any other encryption key standard at any other lengths.

Next, at operation 222, the client device 210A-210Z transmits the data encryption key to the key management server 215 for encryption or wrapping. In response, the key management server 215 can wrap or encrypt the data encryption key using a key encryption key and provide the encrypted data encryption key to the client device 210A-210Z. In some implementations, the key management server 215 can verify a document identifier (e.g., a name of the document) and/or user identifier (e.g., username@domain.com) associated with the client device 210A-210Z before performing the wrapping or encryption.

The key encryption key can be used for both encryption and decryption of the data encryption key. The key management server 215 can generate the key encryption key. The key management server 215 can generate the key encryption key, for example, according to the AES at a length of 256 bits. The key management server 215 can generate the key encryption key based on any other encryption key standard at any other lengths. At operation 224, the client device 210A-210Z receives the encrypted key from the key management server 215. In another implementation, the client device 210A-210Z can request the key management server 215 to provide the key encryption key and perform the wrapping or encryption of the data encryption key using the key encryption key by itself.

Then, at operation 226, the client device 210A-210Z provides encrypted data to the cloud server 212. That is, the client device 210A-210Z combines both the encrypted edit and encrypted key and transmits the combined data to the cloud server 212. In response, the cloud server 212 stores the encrypted data. The cloud server 212 also provides the encrypted data to an appropriate client device(s) 210A-210Z associated with other collaborator(s) of the document. In this way, the collaborator(s) of the document can have access to the same or substantially the same version of the document.

As such, the client device 210A-210Z prevents the cloud server 212 and the key management server 215 to access the edit (in a decrypted form) by ensuring that neither the cloud server 212 nor the key management server 215 is provided with both an encrypted edit and a corresponding data encryption key for decrypting the encrypted edit. That is, the client device 210A-210Z provides the encrypted edit and the encrypted key to the cloud server 212. Furthermore, the client device 210A-210Z provides only the corresponding data encryption key, but not the encrypted edit to the key management server 215. Nevertheless, collaborators would have access to the decrypted edit because a client device 210A-210Z of each collaborator will receive the encrypted edit from the cloud server 212 and obtain the corresponding data encryption key through the key management server 215, as will be described in details below with respect to FIG. 2B.

Figure 2B:
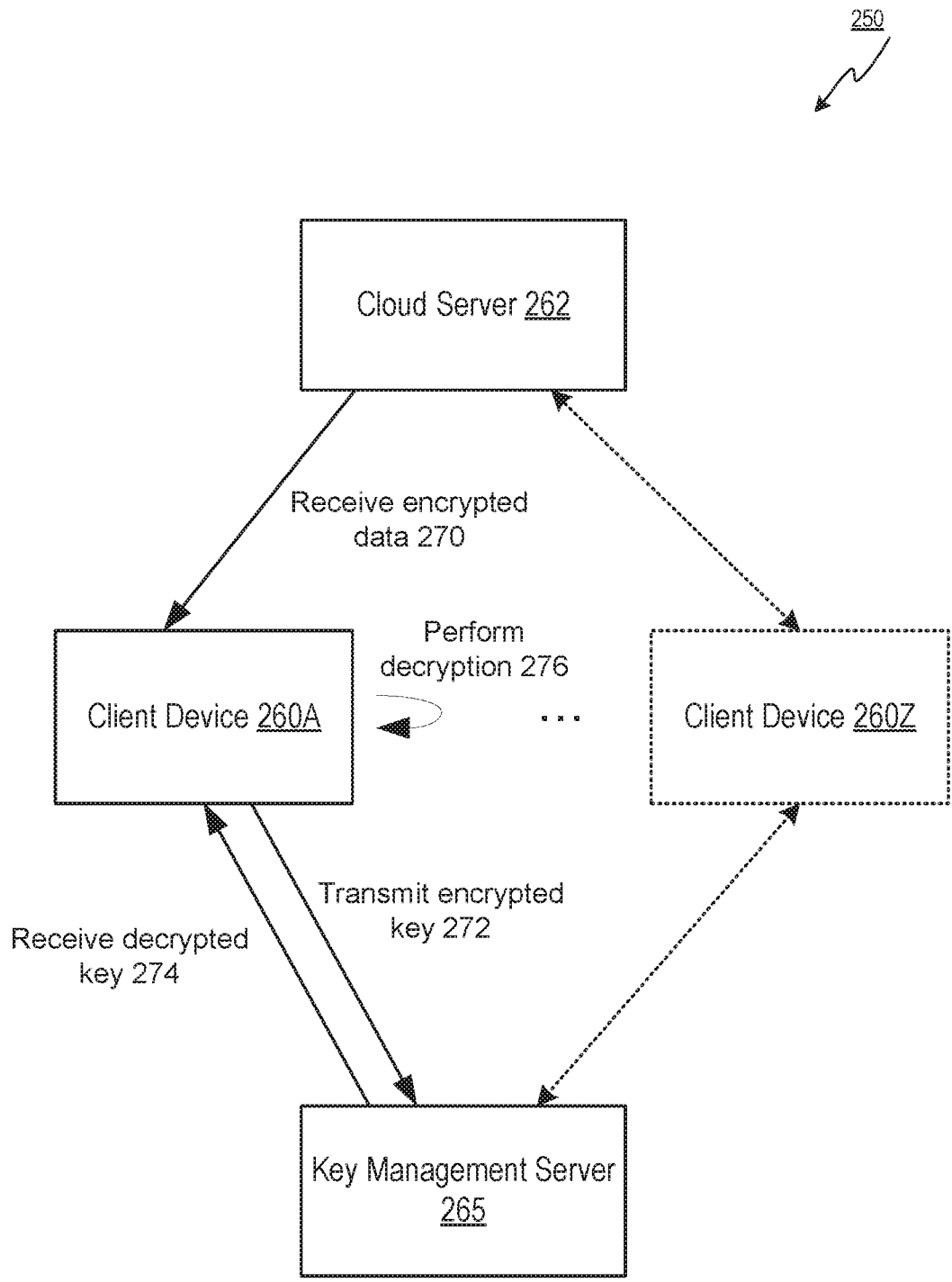
FIG. 2B illustrates an example of a system architecture for providing secure collaborative editing of a document, in accordance with another implementation of the disclosure.

FIG. 2B illustrates an example of a system architecture 250 for providing secure collaborative editing of a document, in accordance with another implementation of the disclosure.

Similar to the system architecture 200 of FIG. 2A, the system architecture 250 includes client devices 260A-260Z, a cloud server 262, and a key management server 265. The client device 260A-260Z is connected with the cloud server 262 and the key management server 265, while the cloud server 262 and the key management server 265 are not connected to each other. The cloud server 262 corresponds to the server 112 of the FIG. 1. The key management server 265 also corresponds to the key management server 215 of FIG. 2A.

Similar to client devices 120A-120Z of FIG. 1 and similar to client devices 210A-210Z of FIG. 2A, a client device 260A-260Z enables a user to collaboratively edit a document in a secure online environment. That is, the user can securely share edits with other collaborators and securely receive edits made by other collaborators without exposing edits in a decrypted form to the cloud server 262 and the key management server 265, as will be described with respect to operations 270 to 276.

At operation 270, a client device 260A-260Z receives encrypted data from the cloud server 262. The encrypted data represents an edit to a portion of a document made by another collaborator of the document. The encrypted data includes the edit encrypted by a data encryption key and the data encryption key encrypted or wrapped by a key encryption key.

At operation 272, the client device 260A-260Z transmits the encrypted key from the encrypted data to the key management server 265. In response, the key management server 265 decrypts the encrypted key with the key encryption key and provides the decrypted key (i.e., the data encryption key) to the client device 260A-260Z. In some implementations, before the decryption, the key management server 265 can confirm a document identifier and/or user identifier associated with the client device 260A-260Z. At operation 274, the client device 260A-260Z receives the data encryption key from the key management server 265. In another implementation, the client device 260A-260Z can request the key management server 265 to provide the key encryption key and obtain the data encryption key by decrypting the encrypted key using the key encryption key.

At operation 276, the client device 260A-260Z performs decryption. For example, the client device 260A-260Z extracts the encrypted edit from the received encrypted data at operation 270. Then, the client device 260A-260Z decrypts the edit using the data encryption key obtained through the key management server 265. Accordingly, the client device 260A-260Z can access the edit made by another collaborator.

In further implementations, a client device 260A-260Z can be associated with a master or collaboration manager role for coordinating the online collaborative editing with the cloud server 262. Such a client device 260A-260Z can ensure that every collaborator has access to the same or substantially the same version of the document in coordination with the cloud server 262. For example, the cloud server 262 can route edits received from collaborators in an encrypted form to the client device 260A-260Z associated with the collaboration manager role. The client device 260A-260Z can then sort the edits, decrypted as described above, in a chronological order (after resolving any conflicts between the edits) and forward the ordered edits to other client devices 260A-260Z of the collaborators. In response, each of the client devices 260A-260Z of the collaborators can update a local version (or a document model) of the document based on the edits received. As such, the collaborators can view latest edits made by others and work on the same or substantially the same version of the document.

Figure 3A:
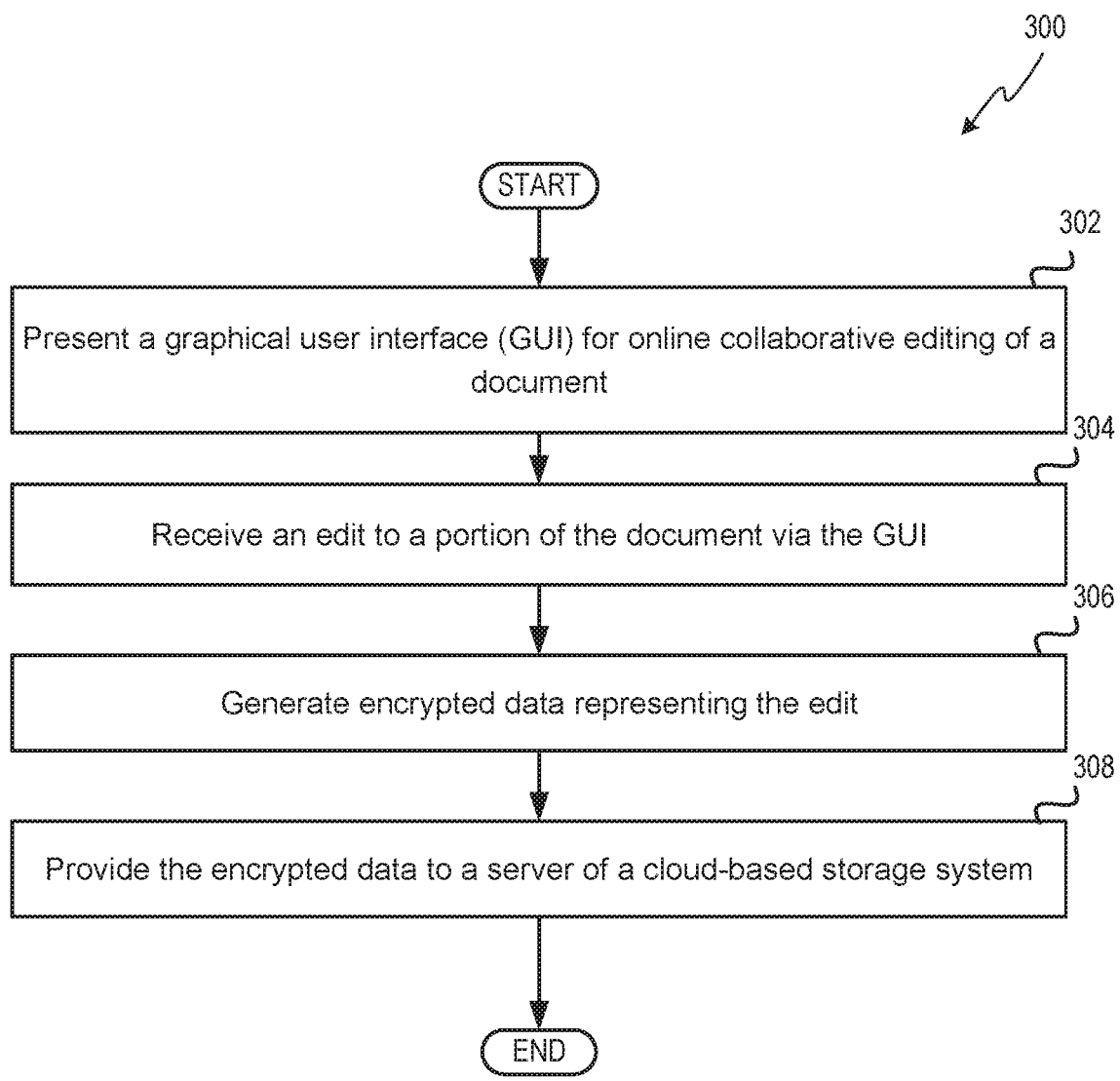
FIG. 3A depicts a flow diagram of a method for generating encrypted data for secure online collaboration, in accordance with one implementation of the disclosure.

FIG. 3A depicts a flow diagram of a method 300 for generating encrypted data for secure online collaboration, in accordance with one implementation of the disclosure. The method 300 may be performed by a client-based application that runs in a web browser of a client device 120A-120Z, 210A-210Z, 260A-260Z, such as using HTML and JavaScript code. The client-based application may be executed by a processing device of the client devices 120A-120Z, 210A-210Z, 260A-260Z. The method 300 may be carried out for each client device 120A-120Z, 210A-210Z, 260A-260Z of the cloud-based content management platform 115. Further, the method 300 may be performed when a user of the client device 120A-120Z, 210A-210Z, 260A-260Z logs into a user account of a cloud storage system provided by the server 112, 212, 262. In another implementation, the method 300 may be performed by the secure collaboration component 116 of FIG. 1. Accordingly, the method 300 may be executed by one or more processing devices of the server 112, 212, 262.

For simplicity of explanation, the method 300 of this disclosure is depicted and described as a series of acts. However, acts in accordance with this disclosure can occur in various orders and/or concurrently, and with other acts not presented and described herein. Furthermore, not all illustrated acts may be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification is capable of being stored on an article of manufacture to facilitate transporting and transferring such method to computing devices. The term "article of manufacture," as used herein, is intended to encompass a computer program accessible from any computer-readable device or storage media.

At operation 302, the processing device of the client device 120A-120Z, 210A-210Z, 260A-260Z presents a graphical user interface (GUI) for online collaborative editing of a document. In one implementation, the GUI includes a portion of the latest version of the document and provides tools for the user to access (e.g., view or edit) the document and any other features needed for online collaboration with other users (i.e., collaborators). The processing device of the client device can obtain the latest version of the document by accessing a local version (or a document model) of the document associated with the user account. The local version of the document would reflect edits made by collaborators (including the user) since the creation of the document until the last time the user accessed the document. The local version is stored on the client device 120A-120Z, 210A-210Z, 260A-260Z and cannot be accessed by a server 112, 212, 262 of a cloud storage system (also referred to as cloud-based content management platform 110). Moreover, the local version can only be managed locally on the client device 120A-120Z, 210A-210Z, 260A-260Z (i.e., by the processing device of the client device) during the collaboration.

In order to obtain the latest version of the document, the client device 120A-120Z, 210A-210Z, 260A-260Z can send a request to the server 112, 212, 262 for any edits received from other collaborators since the last access by the user. For example, the processing device can provide the server 112, 212, 262 with log-in credentials (e.g., a user identifier such as 'username@domain.com' and a password) of the user account of the cloud storage system. After the successful log-in, the server 112, 212, 262 can provide to the client device 120A-120Z, 210A-210Z, 260A-260Z (e.g., via a UI representing a home screen of the user account) a list of documents (e.g., word documents, spreadsheet documents, presentation slides) stored by the server 112, 212, 262 for the user account.

The server 112, 212, 262 can store the documents in an encrypted form but has no access to a decrypted form of the documents. Each document stored on the server 112, 212, 262 can correspond to a group of encrypted data received from client devices 120A-120Z, 210A-210Z, 260A-260Z associated with collaborators of the document. The group of encrypted data represents all edits made to the document since the document has been created. Accordingly, the server 112, 212, 262 stores the entire content of the document in an encrypted form. Further details of the encrypted data will be described below.

The client device 120A-120Z, 210A-210Z, 260A-260Z can receive a selection of a document listed on the home screen from the user via the web browser and indicate the selection to the server 112, 212, 262 along with the time when the user last logged out of the cloud storage system. In response, the server 112, 212, 262 can provide any edits received from other collaborators in an encrypted form to the client device 120A-120Z, 210A-210Z, 260A-260Z. The client device 120A-120Z, 210A-210Z, 260A-260Z can decrypt the received data in a similar manner as will be described with respect to FIG. 3B. Then, the client device 120A-120Z, 210A-210Z, 260A-260Z can incorporate the edits made by other collaborators into the local version, thereby updating the local version to correspond to be the latest version of the document.

At operation 304, the client device 120A-120Z, 210A-210Z, 260A-260Z receives an edit to a portion of the document via the GUI. Examples of the edit or mutation can include a keystroke(s) in a portion (at a particular index or location) of the document and an icon or menu selection changing a format of text in a portion of the document. The client device 120A-120Z, 210A-210Z, 260A-260Z can receive the edit via the GUI from the user of the client device 120A-120Z, 210A-210Z, 260A-260Z. The client device 120A-120Z, 210A-210Z, 260A-260Z can receive the keystroke(s) and/or an icon or menu selection(s) performed over a period of time (e.g., 0.5 second) and identify the series of input as an edit. In another example, the client device 120A-120Z, 210A-210Z, 260A-260Z can receive, as an edit, each keystroke or an icon or menu selection. Additionally, the client device 120A-120Z, 210A-210Z, 260A-260Z can update the document on the GUI to reflect the received edit. For example, the client device 120A-120Z, 210A-210Z, 260A-260Z can incorporate the received edit to the local version of the document and present the updated version on the GUI.

In further implementations, the client device 120A-120Z, 210A-210Z, 260A-260Z can log the received edit at operation 304. For example, the client device 120A-120Z, 210A-210Z, 260A-260Z can record a log entry comprising the edit (e.g., a keystroke(s) in a portion of the document, an icon or a menu selection for text in a portion of the document), a timestamp representing the time when the edit was received, a user identifier, and/or a document identifier (e.g., a name of the document). The log entry can later be used to resolve any conflicts in updating the local version of the document as will be described with respect to FIG. 4.

The log entries can be also used to sort edits made by collaborators of the document, in case the user account associated with the client device 120A-120Z, 210A-210Z, 260A-260Z is assigned a master or collaboration manager role in the online collaborative editing of the document. Such a role necessitates the client device 120A-120Z, 210A-210Z, 260A-260Z associated with the collaboration manager user account to manage the online collaborative editing using the log by ensuring that every collaborator has access to the same or substantially the same version of the document. The client device 120A-120Z, 210A-210Z, 260A-260Z receives edits made by collaborators from the server 112, 212, 262 and logs every edit as described above. The client device 120A-120Z, 210A-210Z, 260A-260Z sorts the edits in a chronological order based on the log entries (after resolving any conflicts). Further, the client device 120A-120Z, 210A-210Z, 260A-260Z distributes the ordered edits to client devices 120A-120Z, 210A-210Z, 260A-260Z of other collaborators so that each local version of the client devices 120A-120Z, 210A-210Z, 260A-260Z is updated in the same way. Further details of the master or collaboration role will be described with respect to FIGS. 3B and 4 below.

At operation 306, the client device 120A-120Z, 210A-210Z, 260A-260Z generates encrypted data representing the edit. In some implementations, the encrypted data can include the edit encrypted based on a data encryption key using symmetric encryption. That is, the client device 120A-120Z, 210A-210Z, 260A-260Z can generate the data encryption key and encrypt the edit using the data encryption key. The symmetric encryption requires only one data encryption key to encrypt and decrypt data. The client device can generate a data encryption key according to the Advanced Encryption Standard (AES). The data encryption key can be at a length of, for example, 256 bits. The client device 120A-120Z, 210A-210Z, 260A-260Z can generate the data encryption key based on any other encryption standard and at any other lengths. The client device 120A-120Z, 210A-210Z, 260A-260Z can generate different data encryption keys each time the client device 120A-120Z, 210A-210Z, 260A-260Z encrypts an edit.

In addition to the encrypted edit, the encrypted data can also include an encrypted key—the data encryption key encrypted or wrapped based on a key encryption key. For example, the client device 120A-120Z, 210A-210Z, 260A-260Z can request a key management server 215, 265 to encrypt or wrap the data encryption key. The key management server 215, 265 is a server that manages encryption and decryption of a data encryption key. The key management server 215, 265 can first authorize the request based on a user identifier and/or document identifier received from the processing device before processing a request encryption and decryption. The key management server 215, 265 can generate a key encryption key that is used for both encryption and decryption of a data encryption key. The key management server 215, 265 can generate the key encryption key according to the AES at a length of 256 bits. The key management server 215, 265 can generate the key encryption key based on any other encryption standards at any other lengths. The key management server 215, 265 can use the same key encryption key for encrypting any data encryption keys associated with the same document or the same group of collaborators. Depending on the request, the key management server 215, 265 can merely provide the key encryption key to the client device 120A-120Z, 210A-210Z, 260A-260Z or can perform the encryption and decryption of a data encryption key. In one implementation, the key management server 215, 265 is only connected to the client device 120A-120Z, 210A-210Z, 260A-260Z and not to the server 112, 212, 262 of the cloud storage system.

In generating the encrypted key, the client device 120A-120Z, 210A-210Z, 260A-260Z can send the data encryption key and a request to encrypt or wrap the data encryption key to the key management server 215, 265. In the request, the client device 120A-120Z, 210A-210Z, 260A-260Z can include identifying information such as a document identifier or a user identifier for authorization by the key management server 215, 265. Subsequently, the client device 120A-120Z, 210A-210Z, 260A-260Z can receive from the key management server 215, 265 the encrypted key. In some other implementations, the client device 120A-120Z, 210A-210Z, 260A-260Z can request a key encryption key from the key management server 215, 265, without requesting the encryption or wrapping to be performed by the key management server 215, 265. In such a case, the client device 120A-120Z, 210A-210Z, 260A-260Z receives the key encryption key from the key management server 215, 265 and locally encrypt the data encryption key using the key encryption key. Furthermore, the client device 120A-120Z, 210A-210Z, 260A-260Z can use the same key encryption key to encrypt any data encryption keys the client device 120A-120Z, 210A-210Z, 260A-260Z generates for encryption of edits associated with the same document.

Because the client device 120A-120Z, 210A-210Z, 260A-260Z only provides the encryption request (and the data encryption key), the key management sever does not have access to any portion of the document either in an encrypted form or decrypted form. Once the client device 120A-120Z, 210A-210Z, 260A-260Z has the encrypted edit and the encrypted key, the client device 120A-120Z, 210A-210Z, 260A-260Z can combine the encrypted edit and the encrypted key to generate the encrypted data.

At operation 308, the client device 120A-120Z, 210A-210Z, 260A-260Z provides the encrypted data to the server 112, 212, 262 of the cloud-based storage system. In some implementations, the client device 120A-120Z, 210A-210Z, 260A-260Z can attach the encrypted key to the encrypted edit and provide a single data packet of the encrypted data to the server 112, 212, 262. In some other implementations, the client device 120A-120Z, 210A-210Z, 260A-260Z can provide the encrypted key and the encrypted edit as separate data packets to the server 112, 212, 262. Furthermore, the client device 120A-120Z, 210A-210Z, 260A-260Z can also provide identifying information (e.g., a document identifier and/or user identifier) and a timestamp (indicating the time when the edit was received) associated with the encrypted data to the server 112, 212, 262. The server 112, 212, 262 can use such identifying information and the timestamp in storing the encrypted data and in determining to which client device 120A-120Z, 210A-210Z, 260A-260Z the encrypted data should be transmitted. Further details about operations of the server 112, 212, 262 will be described with respect to FIG. 4 below. In case the client device 120A-120Z, 210A-210Z, 260A-260Z is associated with the master or collaboration manager user account, the client device 120A-120Z, 210A-210Z, 260A-260Z can skip operations 306 and 308 because the client device 120A-120Z, 210A-210Z, 260A-260Z should wait until a certain condition is satisfied before performing operations 306 and 308 as will be described below with respect to FIG. 3B.

Figure 3B:
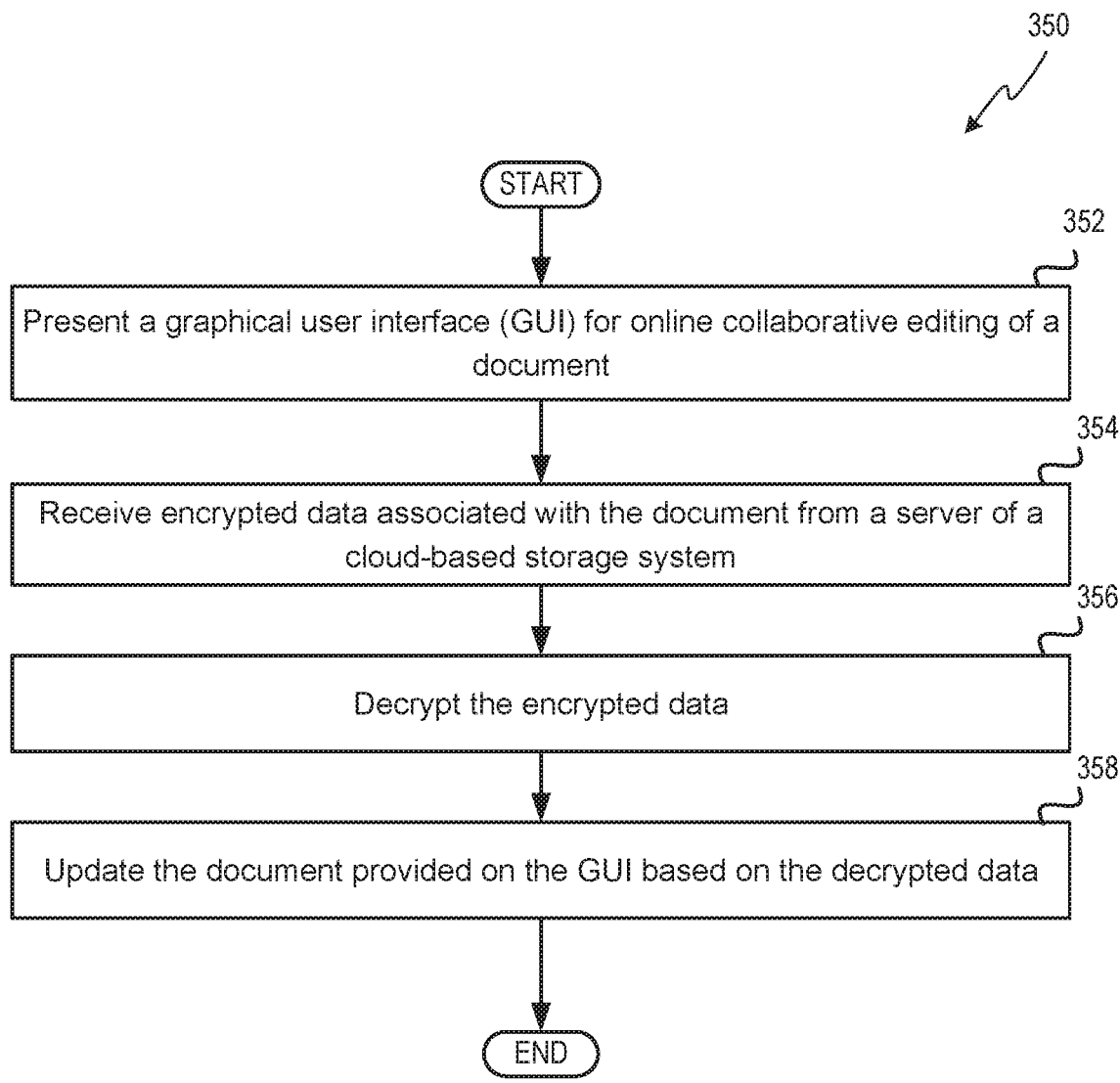
FIG. 3B illustrates a flow diagram of a method for updating an online collaborative document based on encrypted data, in accordance with one implementation of the disclosure.

FIG. 3B illustrates a flow diagram of a method 350 for updating an online collaborative document based on encrypted data, in accordance with one implementation of the disclosure. The method 350 may be performed by a client-based application that runs in a web browser of a client device 120A-120Z, 210A-210Z, 260A-260Z, such as using HTML and JavaScript code. The client-based application may be executed by a processing device of the client devices 120A-120Z, 210A-210Z, 260A-260Z. The method 350 may be carried out for each client device 120A-120Z, 210A-210Z, 260A-260Z of the cloud-based content management platform 115. Further, the method 350 may be performed when a user of the client device 120A-120Z, 210A-210Z, 260A-260Z logs into a user account of a cloud storage system provided by the server 112, 212, 262. In another implementation, the method 350 may be performed by the secure collaboration component 116 of FIG. 1. Accordingly, the method 350 may be executed by one or more processing devices of the server 112, 212, 262.

For simplicity of explanation, the method 350 of this disclosure is depicted and described as a series of acts. However, acts in accordance with this disclosure can occur in various orders and/or concurrently, and with other acts not presented and described herein. Furthermore, not all illustrated acts may be required to implement the method 350 in accordance with the disclosed subject matter. In addition, those skilled in the art will understand and appreciate that the method 350 could alternatively be represented as a series of interrelated states via a state diagram or events. Additionally, it should be appreciated that the method 350 disclosed in this specification are capable of being stored on an article of manufacture (e.g., a computer program accessible from any computer-readable device or storage media) to facilitate transporting and transferring such method to computing devices.

At operation 352, the client device 120A-120Z, 210A-210Z, 260A-260Z presents a graphical user interface (GUI) for online collaborative editing of a document. The client device 120A-120Z, 210A-210Z, 260A-260Z can provide the GUI in a similar manner as described with respect to operation 302 of FIG. 3A. The client device 120A-120Z, 210A-210Z, 260A-260Z can present, via the web browser, the GUI that enables the user to edit the document.

At operation 354, the client device 120A-120Z, 210A-210Z, 260A-260Z receives encrypted data associated with the document from the server 112, 212, 262 of the cloud-based storage system. In one implementation, the encrypted data has been generated by another client device 120A-120Z, 210A-210Z, 260A-260Z in a similar manner described with respect to operation 306 of FIG. 3A above. Accordingly, the encrypted data represents an edit to a portion of the document. The encrypted data includes an edit that has been encrypted using a data encryption key. The edit, such as a keystroke(s) and/or an icon or menu selection has been made by collaborator(s) of the document. The encrypted data also includes an encrypted key—the data encryption key encrypted or wrapped based on a key encryption key. The client device 120A-120Z, 210A-210Z, 260A-260Z can further receive a timestamp associated with the encrypted data. The timestamp can represent the time when the edit was made or the time the server 112, 212, 262 received the encrypted data from another client device 120A-120Z, 210A-210Z, 260A-260Z.

At operation 356, the client device 120A-120Z, 210A-210Z, 260A-260Z decrypts the encrypted data. If the client device 120A-120Z, 210A-210Z, 260A-260Z has the key encryption key (as previously received from a key management server 215, 265), then the client device 120A-120Z, 210A-210Z, 260A-260Z can decrypt the encrypted key using the key encryption key. Then, the client device 120A-120Z, 210A-210Z, 260A-260Z can decrypt the encrypted edit based on the decrypted key.

In case the client device 120A-120Z, 210A-210Z, 260A-260Z does not already have the key encryption key, the client device 120A-120Z, 210A-210Z, 260A-260Z can request the key management server 215, 265 for decryption of the encrypted key included in the encrypted data. Similar to the key management server 215, 265 of the FIG. 3A, the key management server 215, 265 manages encryption and decryption of a data encryption key and is only connected to the client device 120A-120Z, 210A-210Z, 260A-260Z and not to the server 112, 212, 262 of the cloud storage system. In some implementations, the client device 120A-120Z, 210A-210Z, 260A-260Z can provide the encrypted key to the key management server 215, 265 as a part of the request for decryption. The client device 120A-120Z, 210A-210Z, 260A-260Z can also transmit identifying information such as a document identifier and/or user identifier for authorization by the key management server 215, 265. After the authorization, the key management server 215, 265 can retrieve a key encryption key corresponding to the received encrypted key based on the identifying information.

Then, the key management server 215, 265 can decrypt the received encrypted key using the key encryption key and provide the decrypted key to the client device 120A-120Z, 210A-210Z, 260A-260Z. In some other implementations, the client device 120A-120Z, 210A-210Z, 260A-260Z can request the key management server 215, 265 to provide the key encryption key for the encrypted key based on the identifying information. The key management server 215, 265 can retrieve the key encryption key based on the identifying information and transmit the key encryption key to the client device 120A-120Z, 210A-210Z, 260A-260Z. In response, the client device 120A-120Z, 210A-210Z, 260A-260Z can decrypt the encrypted key using the received key encryption key. Once the client device 120A-120Z, 210A-210Z, 260A-260Z has the key encryption key, the client device 120A-120Z, 210A-210Z, 260A-260Z can re-use the same key encryption key to decrypt any encrypted keys associated with the same document. In response to obtaining the decrypted key (i.e., the data encryption key), the client device 120A-120Z, 210A-210Z, 260A-260Z can decrypt the encrypted edit that was included in the encrypted data using the data encryption key.

In further implementations, the client device 120A-120Z, 210A-210Z, 260A-260Z can log the decrypted edit at operation 356 in a similar manner described with respect to FIG. 3A above, in case the client device 120A-120Z, 210A-210Z, 260A-260Z is associated with the master or collaboration manager user account. For example, the client device 120A-120Z, 210A-210Z, 260A-260Z can record a log entry comprising the edit (e.g., a keystroke(s) in a portion of the document, an icon or a menu selection for text in a portion of the document), a timestamp representing the time when the edit was received, a user identifier, and/or a document identifier (e.g., a name of the document)).

Moreover, the client device 120A-120Z, 210A-210Z, 260A-260Z associated with the collaboration manager user account can determine whether or not to consolidate or combine edits received so far. The client device 120A-120Z, 210A-210Z, 260A-260Z can base the determination on a period of time passed since the last consolidation which can be identified from the log. That is, the client device 120A-120Z, 210A-210Z, 260A-260Z can consolidate edits on a periodic basis. In other implementations, the client device 120A-120Z, 210A-210Z, 260A-260Z can base the determination on a number of edits received since the last consolidation (i.e., the client device 120A-120Z, 210A-210Z, 260A-260Z can wait until a particular number of edits are received before the consolidation).

Once the client device 120A-120Z, 210A-210Z, 260A-260Z determines to consolidate edits made to the document by collaborators, the client device 120A-120Z, 210A-210Z, 260A-260Z can sort edits in a chronological order using timestamps of log entries. The client device 120A-120Z, 210A-210Z, 260A-260Z can combine the sorted edits into a single edit. For example, a first edit can be an insertion of a sentence and a second edit can be an insertion of a word in the middle of the sentence. Then, the client device 120A-120Z, 210A-210Z, 260A-260Z can combine the two edits into a single edit having an insertion of the sentence updated with the inserted word. In some implementations, the client device 120A-120Z, 210A-210Z, 260A-260Z can prepare the consolidated edit specific to each collaborator. In such a case, the client device 120A-120Z, 210A-210Z, 260A-260Z can maintain separate logs for each collaborator. In some other implementations, the client device 120A-120Z, 210A-210Z, 260A-260Z can generate the consolidated edit for all collaborators.

In case there are overlapping or conflicting edits having the same or substantially the same timestamp (e.g., within a second), the client device 120A-120Z, 210A-210Z, 260A-260Z can resolve any conflicts using a set of rules. Examples of overlapping or conflicting edits include one edit for inserting a word in a sentence and another edit for deleting the sentence. In such a case, the client device 120A-120Z, 210A-210Z, 260A-260Z can apply a rule (e.g., the deletion is given the priority over insertion) to remove the sentence from the document.

Once the client device 120A-120Z, 210A-210Z, 260A-260Z has generated the consolidated edit, the client device 120A-120Z, 210A-210Z, 260A-260Z can encrypt the consolidated edit in a similar manner as described above with respect to FIG. 3A. That is, the client device 120A-120Z, 210A-210Z, 260A-260Z associated with the collaboration manager user account generates a data encryption key and encrypts the consolidated edit with the data encryption key. The client device 120A-120Z, 210A-210Z, 260A-260Z can then request the key management server 215, 265 for encryption or wrapping of the data encryption key. Once the client device 120A-120Z, 210A-210Z, 260A-260Z obtains the encrypted edit and the encrypted key, the client device 120A-120Z, 210A-210Z, 260A-260Z can provide the encrypted data to the server 112, 212, 262 of the cloud storage system. In case the client device 120A-120Z, 210A-210Z, 260A-260Z has generated the consolidated edit specific to a collaborator, the client device 120A-120Z, 210A-210Z, 260A-260Z can also provide a user identifier of the collaborator for a target destination address so that the server 112, 212, 262 can determine to which collaborator the encrypted data is to be provided.

At operation 358, the client device 120A-120Z, 210A-210Z, 260A-260Z updates the document provided on the GUI based on the decrypted data. For example, the client device 120A-120Z, 210A-210Z, 260A-260Z can apply the decrypted edit to the local version of the document maintained by the client device 120A-120Z, 210A-210Z, 260A-260Z so that the local version can be updated to the latest version. The edit can be the consolidated edit generated by the client device 120A-120Z, 210A-210Z, 260A-260Z of the collaboration manager reflecting edits made by collaborators of the document. In case the client device 120A-120Z, 210A-210Z, 260A-260Z is associated with the master or collaboration manager user account, the edit would be made by one other collaborator.

In one implementation, when applying the decrypted edit to the local version of the document, the client device 120A-120Z, 210A-210Z, 260A-260Z can identify conflicting or overlapping edits between an edit already made by the user of the client device 120A-120Z, 210A-210Z, 260A-260Z and the decrypted edit. For example, the user of the client device 120A-120Z, 210A-210Z, 260A-260Z could have added a word to a sentence (i.e., a local edit) in the version of the document, but the decrypted edit could be a deletion of the sentence at the same or substantially the same time. The client device 120A-120Z, 210A-210Z, 260A-260Z can determine the timing of the local edit from log entries that includes edits made to the local version by the user and the timing of the decrypted edit from the timestamp received in association with the encrypted data at operation 354. The client device 120A-120Z, 210A-210Z, 260A-260Z can resolve the conflict using a set of rules. The client device 120A-120Z, 210A-210Z, 260A-260Z can, for example, apply a rule that gives a priority to a deletion over an insertion. As a result, when updating the version of the document, the client device 120A-120Z, 210A-210Z, 260A-260Z can undo or remove already applied edit and instead apply the decrypted edit.

Figure 4:
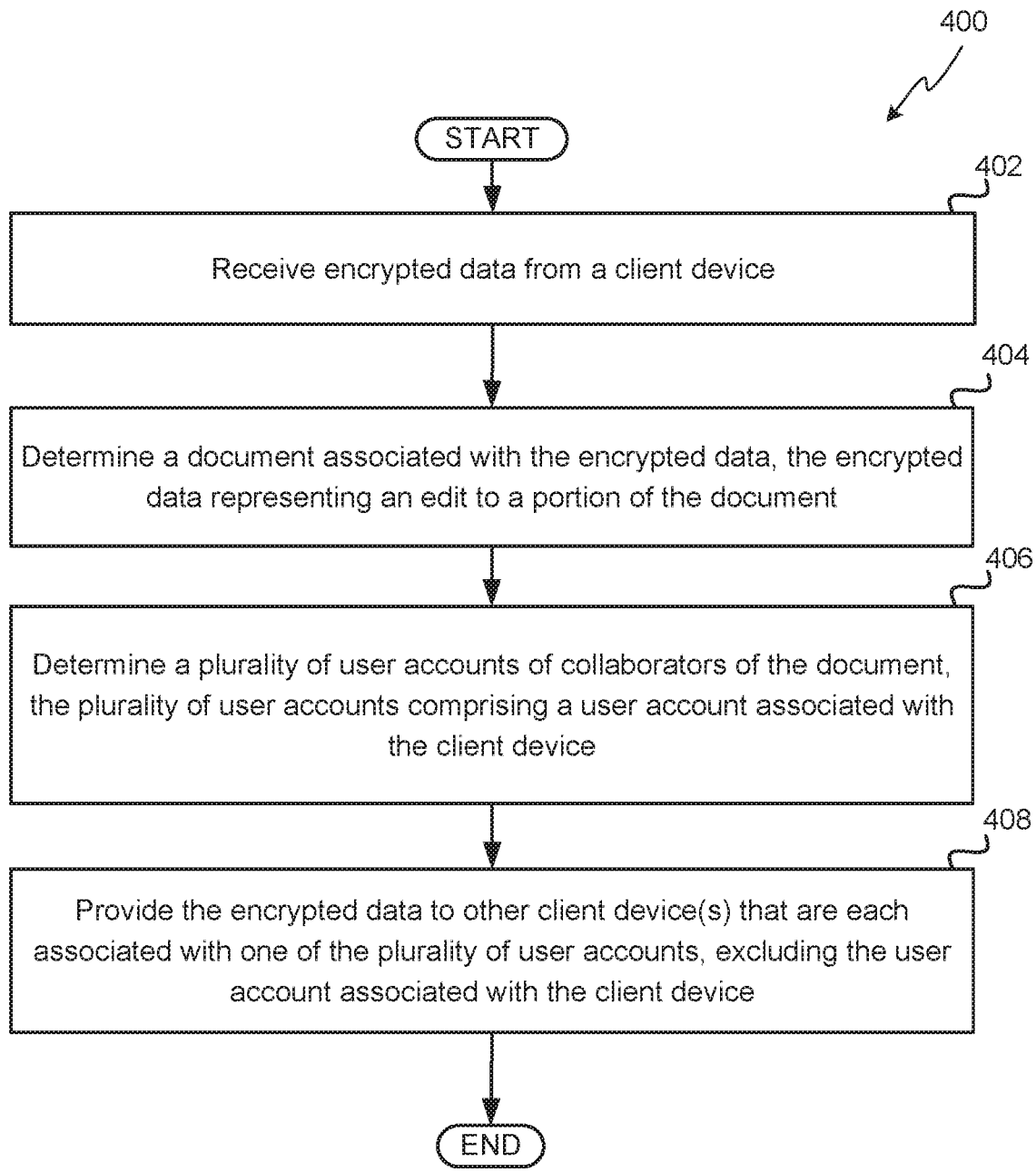
FIG. 4 depicts a flow diagram of a method for providing encrypted data to collaborators, in accordance with one implementation of the disclosure.

FIG. 4 depicts a flow diagram of a method 400 for providing encrypted data to collaborators, in accordance with one implementation of the disclosure. The method 400 may be performed by the secure collaboration component 116 of FIG. 1. The method 400 may be executed by one or more processing devices of the server 112, 212, 262. The method 400 may be carried out for each client device 120A-120Z, 210A-210Z, 260A-260Z of the cloud-based content management platform 115.

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices.

At operation 402, a cloud storage system (i.e., the processing device of the cloud storage system) receives encrypted data from a client device 120A-120Z, 210A-210Z, 260A-260Z. The encrypted data represents an edit to a portion of a document. Examples of the edit or mutation can include a keystroke(s) in a portion (at a particular index or location) of the document and an icon or menu selection changing a format of text in a portion of the document. The encrypted data can include an encrypted edit and encrypted key. The encrypted edit corresponds to the edit encrypted using a data encryption key. The encrypted key corresponds to the data encryption key encrypted or wrapped using a key encryption key. Because the data encryption key is encrypted using the key encryption key and the processing device does not have access to the key encryption key, the processing device cannot decrypt the (encrypted) edit. Consequently, the cloud storage system cannot access any portion of the document in a decrypted form.

The cloud storage system can also receive identifying information of the encrypted data such as a user identifier (e.g., username@domain.com) associated with the client device 120A-120Z, 210A-210Z, 260A-260Z and a document identifier (e.g., a name of the document) of the document associated with the edit. In some implementations, the cloud storage system can receive a timestamp indicating when the edit was received at the client device 120A-120Z, 210A-210Z, 260A-260Z. In case the cloud storage system does not receive the time stamp, the cloud storage system can generate a timestamp indicating when the encrypted data was received. The cloud storage system can use such identifying information and the timestamp in storing the encrypted data and in determining to which client device 120A-120Z, 210A-210Z, 260A-260Z the encrypted data should be transmitted.

In response to receiving the encrypted data, the cloud storage system can store the encrypted data in association with the identifying information and/or the timestamp in a data store of the cloud-based storage system. Based on the timestamps, the cloud storage system can store the encrypted data in a chronological order for the encrypted data having the same document identifier. Accordingly, the cloud storage system can store all edits made to a document since the document has been created in an encrypted form. Such edits would effectively represent the respective document. As such, the cloud-based storage system stores a plurality of documents in an encrypted form.

At operation 404, the cloud storage system determines a document associated with the encrypted data. In one implementation, the cloud storage system can identify which document is associated with the encrypted data based on the identifying information (i.e., a document identifier) received from the client device 120A-120Z, 210A-210Z, 260A-260Z. In case the cloud storage system has not received the document identifier, the cloud storage system can request the client device 120A-120Z, 210A-210Z, 260A-260Z for the identifying information.

At operation 406, the cloud storage system determines user accounts of collaborators of the document. In one implementation, the cloud storage system can determine user identifiers representing user accounts and that are associated with the document identifier of the determined document from a data store. The data store can store a table listing document identifiers with associated user identifiers. The data store can be included in the cloud storage system. For each document identifier in the data store, user accounts that have access (e.g., view or edit) to a document associated with the respective document identifier can be recorded. Thus, a user account associated with the client device 120A-120Z, 210A-210Z, 260A-260Z should be included in the determined user accounts (because the edit represented by the encrypted data received at operation 402 was made by a user of the user account associated with the client device 120A-120Z, 210A-210Z, 260A-260Z).

In further implementations, the cloud storage system can determine a user account having a master or collaboration manager role assigned. The collaboration manager role is for coordinating the online collaborative editing with the cloud storage system by ensuring that ensures every collaborator has access to the same or substantially the same version of the document. In the data store, for each user identifier associated with a document identifier, it can be recorded whether or not the respective user identifier is assigned a master or collaboration manager role in online collaborative editing of a document associated with the corresponding document identifier. Thus, the cloud storage system can determine from the data store the collaboration manager role user account based on the document identifier.

The respective user may not be aware of this role because all processes related to the assignment of this role can be carried out in the background by the cloud storage system and the server 112, 212, 262. The cloud storage system can coordinate with a client device 120A-120Z, 210A-210Z, 260A-260Z associated with the collaboration manager role to ensure that collaborators have access to the same or substantially the same version of the document. For example, when the cloud storage system receives encrypted data from a client device 120A-120Z, 210A-210Z, 260A-260Z not associated with the collaboration manager role, the cloud storage system can route the encrypted data to a client device 120A-120Z, 210A-210Z, 260A-260Z associated with the collaboration manager role. The client device 120A-120Z, 210A-210Z, 260A-260Z associated with the collaboration manager role can consolidate edits (after decrypting the encrypted data) made by collaborators into encrypted data that is sent to the cloud storage system. The cloud storage system then distributes the encrypted data received from the client device 120A-120Z, 210A-210Z, 260A-260Z associated with the collaboration manager role to the other collaborators.

In some embodiments, there should be only one user identifier assigned to that role by the cloud storage system. Initially, the cloud storage system can configure a user account of a user who created a document to perform the collaboration manager role. The cloud storage system can designate the collaboration manager role to the user account and record as such in the data store. The cloud storage system can change the role assignment under certain circumstances.

For example, when the cloud storage system detects that a user having the collaboration manager user account of the current document logs out of the cloud storage system, the cloud storage system can reassign the role to another collaborator. In another example, when the cloud storage system detects a response time of a client device 120A-120Z, 210A-210Z, 260A-260Z associated with the collaboration manager user account satisfies a predetermined threshold condition (e.g., the client device 120A-120Z, 210A-210Z, 260A-260Z associated with the collaboration manager has not provided a response for more than 2 seconds), the cloud storage system can reassign the role to another collaborator. An example of the response time can include a time period since the cloud storage system has provided an encrypted data to the client device 120A-120Z, 210A-210Z, 260A-260Z of the collaboration manger until the cloud storage system has received another encrypted data from the client device 120A-120Z, 210A-210Z, 260A-260Z of the collaboration manger. In addition or in the alternative, the response time can be any period of time the client device 120A-120Z, 210A-210Z, 260A-260Z of the collaboration manger took to respond to communication from the cloud storage system. The cloud storage system can reassign the role to any other collaborators who is currently logged into the cloud storage system.

At operation 408, the cloud storage system provides the encrypted data to other client device(s) 120A-120Z, 210A-210Z, 260A-260Z that are each associated with respective user accounts, excluding the user account associated with the client device 120A-120Z, 210A-210Z, 260A-260Z. That is, the cloud storage system does not send the encrypted data back to the sender. In one implementation, the cloud storage system can determine whether the client device 120A-120Z, 210A-210Z, 260A-260Z that sent the encrypted data is assigned the collaboration manager role. If the client device 120A-120Z, 210A-210Z, 260A-260Z is associated with the collaboration manager user account, then the encrypted data represents an edit to a portion of the document that was made by collaborators of the document. Thus, such encrypted data should be distributed to collaborators other than the collaboration manager. On the other hand, if the client device 120A-120Z, 210A-210Z, 260A-260Z is not associated with the collaboration manager role, then the encrypted data represents an edit to a portion of the document made by a respective user of the client device 120A-120Z, 210A-210Z, 260A-260Z. Accordingly, the encrypted data can be routed to the client device 120A-120Z, 210A-210Z, 260A-260Z associated with the collaboration manager role so that the client device 120A-120Z, 210A-210Z, 260A-260Z can consolidate edits from various collaborators.

The cloud storage system can determine from the data stored in the data store whether the client device 120A-120Z, 210A-210Z, 260A-260Z is associated with the collaboration manager role based on a user identifier of the client device 120A-120Z, 210A-210Z, 260A-260Z. The cloud storage system can receive the user identifier in association with the encrypted data at operation 402. In case the cloud storage system has not received the user identifier, the cloud storage system can request the client device 120A-120Z, 210A-210Z, 260A-260Z to provide the user identifier.

In case the cloud storage system determines that the client device 120A-120Z, 210A-210Z, 260A-260Z is associated with the collaboration manager role, the cloud storage system can determine collaborators other than the collaboration manager from the user accounts of collaborators of the document determined at operation 406. Then, the cloud storage system can transmit the encrypted data to client devices 120A-120Z, 210A-210Z, 260A-260Z associated with the other collaborators of the document. Accordingly, the cloud storage system can route the consolidated edit from the collaboration manager to other collaborators so that every collaborator can see all the changes made to the document and access the same or substantially the same version of the document.

In another implementation, the cloud storage system can determine from the encrypted data or any other data received with the encrypted data whether there is any information (e.g., a user identifier) about target destination address of the encrypted data provided by the collaboration manager for a specific collaborator. If the cloud storage system determines such information, the cloud storage system can provide the encrypted data only to a client device 120A-120Z, 210A-210Z, 260A-260Z associated with the target destination address.

In case the cloud storage system determines that the client device 120A-120Z, 210A-210Z, 260A-260Z that sent the encryption data is not associated with the collaboration manager role, the cloud storage system can determine from user accounts of collaborators of the document determined at operation 406 a user account associated with the collaboration manager role. As such, the cloud storage system can route edits made by collaborators to the collaboration manager client device 120A-120Z, 210A-210Z, 260A-260Z so that the collaboration manager can consolidate the edits that are later to be distributed to other collaborators. As a result, the cloud storage system can effectively ensure that the user edits the same or substantially the same version of the document as other collaborators.

Figure 5:
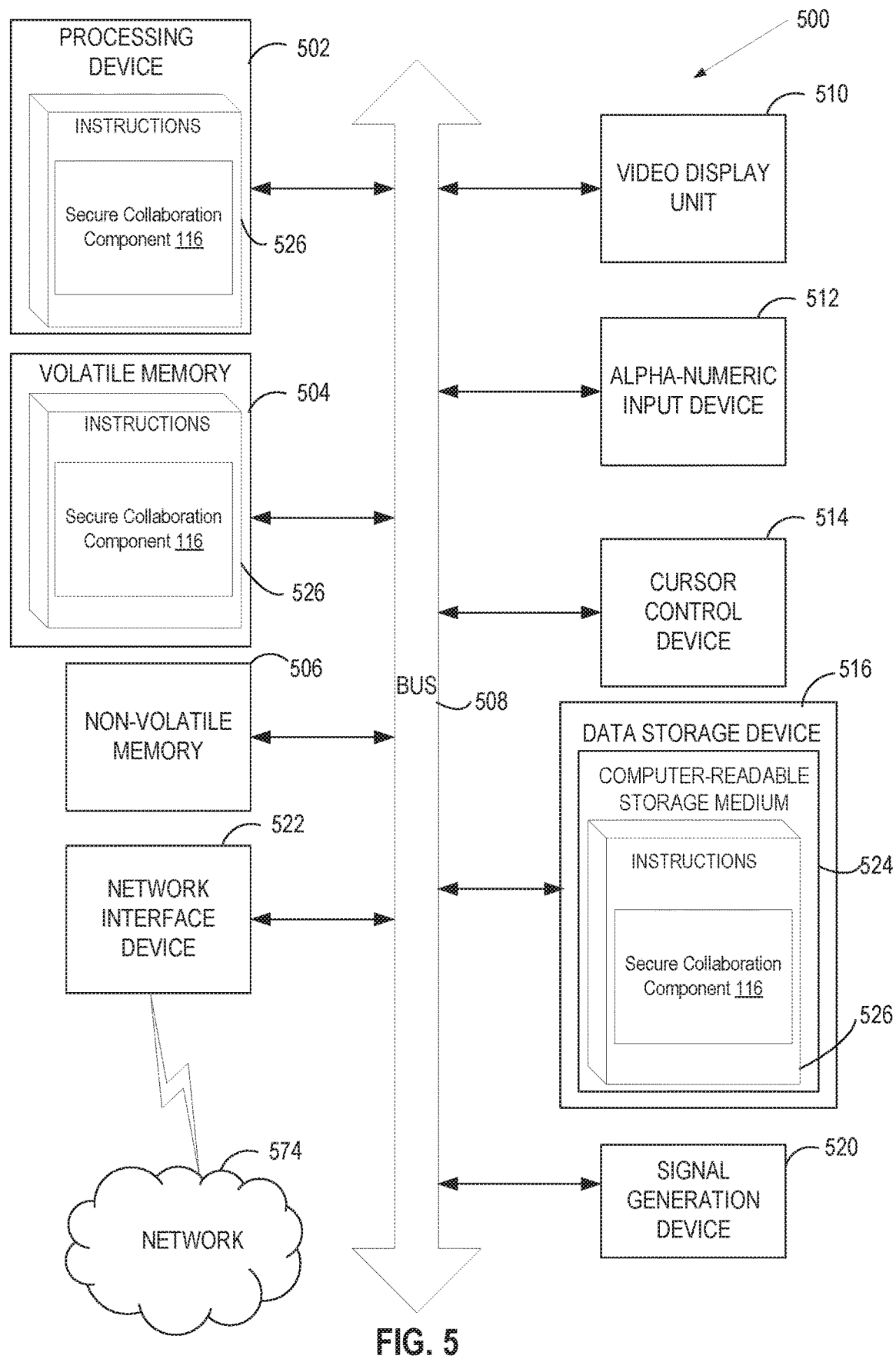
FIG. 5 depicts a block diagram of an example computing system operating in accordance with one or more aspects of the present disclosure.

FIG. 5 depicts a block diagram of an example computing system operating in accordance with one or more aspects of the present disclosure. In various illustrative examples, computer system 500 may correspond to any of the computing devices within system architecture 100 of FIG. 1. In one implementation, the computer system 500 may be a server 112. In another implementation, the computer system 500 may be each of the client devices 120A-120Z, 210A-210Z, 260A-260Z.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions implementing the secure collaboration component 116 of FIG. 1 for implementing the methods described herein.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "presenting", "generating", "updating", "providing", "determining", "encrypting", "decrypting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, at a first server of a cloud-based storage system, first encrypted data from a first client device, wherein the cloud-based storage system stores a plurality of documents in an encrypted form;
determining, at the first server, which document of the plurality of documents stored in the encrypted form is associated with the first encrypted data, wherein the first encrypted data includes an encrypted edit to a portion of the document stored in the encrypted form and a data encryption key encrypted by a second server for transmission to the first server, wherein the first server is unable to decrypt both the document in the encrypted form and the first encrypted data, and wherein the data encryption key is used by the first client device to produce the encrypted edit;
determining, at the first server, a plurality of user accounts of collaborators of the document, the plurality of user accounts comprising a first user account associated with the first client device; and
providing, by the first server, the first encrypted data to one or more other client devices that are each associated with one of the plurality of user accounts, excluding the first user account.

2. The method of claim 1, wherein
the data encryption key is encrypted based on a key encryption key, wherein the key encryption key is not accessible to the first server.

3. The method of claim 2, wherein the key encryption key is provided by the second server not connected to the first server and connected to the first client device and the one or more other client devices.

4. The method of claim 1, further comprising:
configuring a second user account from the plurality of user accounts of collaborators to coordinate with the first server for collaborative editing of the document, wherein a second client device associated with the second user account is to combine edits to the document made by the collaborators in a chronological order and generate second encrypted data based on the combined edits.

5. The method of claim 4, wherein:
the determining of the plurality of user accounts of collaborators of the document comprises determining that the first user account corresponds to a user account other than the second user account; and
the providing of the first encrypted data comprises providing the first encrypted data to the second client device that is associated with the second user account, the second client device being one of the one or more other client devices.

6. The method of claim 4, wherein:
the determining of the plurality of user accounts of collaborators of the document comprises determining that the first user account corresponds to the second user account; and
the providing of the first encrypted data comprises providing the first encrypted data to the one or more other client devices that are each associated with one of the plurality of user accounts other than the second user account, wherein the first encrypted data corresponds to the second encrypted data.

7. The method of claim 3, wherein the first client device is to perform operations comprising:
generating the data encryption key;
encrypting the edit based on the data encryption key;
providing the data encryption key to the second server;
obtaining the encrypted data encryption key based on encryption of the data encryption key using the key encryption key provided by the second server; and
combining the encrypted edit with the encrypted data encryption key to generate the first encrypted data.

8. A cloud-based storage system comprising:
a memory; and
a processing device operatively coupled to the memory, the processing device to:
receive, at a first server of a cloud-based storage system, first encrypted data from a first client device, wherein the cloud-based storage system stores a plurality of documents in an encrypted form;
determine, at the first server, which document of the plurality of documents stored in the encrypted form is associated with the first encrypted data wherein the first encrypted data includes an encrypted edit to a portion of the document stored in the encrypted form and a data encryption key encrypted by a second server for transmission to the first server, wherein the first server is unable to decrypt both the document in the encrypted form and the first encrypted data, and wherein the data encryption key is used by the first client device to produce the encrypted edit;
determine, at the first server, a plurality of user accounts of collaborators of the document, the plurality of user accounts comprising a first user account associated with the first client device; and
provide, by the first server, the first encrypted data to one or more other client devices that are each associated with one of the plurality of user accounts, excluding the first user account.

9. The system of claim 8, wherein
the data encryption key is encrypted based on a key encryption key, wherein the key encryption key is not accessible to the cloud-based storage system and wherein the key encryption key is provided by the second server not connected to the cloud-based storage system and connected to the first client device and the one or more other client devices.

10. The system of claim 8, wherein the processing device is to further:
configure a second user account from the plurality of user accounts of collaborators to coordinate with the processing device for collaborative editing of the document, wherein a second client device associated with the second user account is to combine edits to the document made by the collaborators in a chronological order and generate second encrypted data based on the combined edits.

11. The system of claim 10, wherein to provide the first encrypted data, the processing device is to:
responsive to determining that the first user account corresponds to a user account other than the second user account, provide the first encrypted data to the second client device that is associated with the second user account, the second client device being one of the one or more other client devices; and
responsive to determining that the first user account corresponds to the second user account, provide the first encrypted data to the one or more other client devices that are each associated with one of the plurality of user accounts other than the second user account, wherein the first encrypted data corresponds to the second encrypted data.

12. The system of claim 9, wherein the first client device is to perform operations comprising:
generating the data encryption key;
encrypting the edit based on the data encryption key;
providing the data encryption key to the second server;
obtaining the encrypted data encryption key based on encryption of the data encryption key using the key encryption key provided by the second server; and
combining the encrypted edit with the encrypted data encryption key to generate the first encrypted data.

13. A non-transitory computer readable storage medium comprising instructions for a server that, when executed by a processing device, cause the processing device to:
receive, at a first server of a cloud-based storage system, first encrypted data from a first client device, wherein the cloud-based storage system stores a plurality of documents in an encrypted form;
determine, at the first server, which document of the plurality of documents stored in the encrypted form is associated with the first encrypted data, wherein the first encrypted data includes an encrypted edit to a portion of the document stored in the encrypted form and a data encryption key encrypted by a second server for transmission to the first server, wherein the first server is unable to decrypt both the document in the encrypted form and the first encrypted data, and wherein the data encryption key is used by the first client device to produce the encrypted edit;
determine, at the first server, a plurality of user accounts of collaborators of the document, the plurality of user accounts comprising a first user account associated with the first client device; and provide, by the first server, the first encrypted data to one or more other client devices that are each associated with one of the plurality of user accounts, excluding the first user account.

14. The non-transitory computer readable storage medium of claim 13, wherein the data encryption key is encrypted based on a key encryption key, wherein the key encryption key is not accessible to the first server and wherein the key encryption key is provided by the second server not connected to the first server and connected to the first client device and the one or more other client devices.

15. The non-transitory computer readable storage medium of claim 13, the processing device is to further:

configure a second user account from the plurality of user accounts of collaborators to coordinate with the server for collaborative editing of the document, wherein a second client device associated with the second user account is to combine edits to the document made by the collaborators in a chronological order and generate second encrypted data based on the combined edits;

responsive to determining that the first user account corresponds to a user account other than the second user account, provide the first encrypted data to the second client device that is associated with the second user account, the second client device being one of the one or more other client devices; and responsive to determining that the first user account corresponds to the second user account, provide the first encrypted data to the one or more other client devices that are each associated with one of the plurality of user accounts other than the second user account, wherein the first encrypted data corresponds to the second encrypted data.

16. The non-transitory computer readable storage medium of claim 14, wherein the first client device is to perform operations comprising:

generating the data encryption key;
encrypting the edit based on the data encryption key;
providing the data encryption key to the second server;
obtaining the encrypted data encryption key based on encryption of the data encryption key using the key encryption key provided by the second server; and
combining the encrypted edit with the encrypted data encryption key to generate the first encrypted data.

17. A method comprising:

providing a graphical user interface (GUI) for online collaborative editing of a document in association with a first server of a cloud-based storage system, wherein the cloud-based storage system stores, in an encrypted form, a plurality of documents including the document;

receiving an edit to a portion of the document via the GUI;
generating encrypted data representing the edit to the portion of the document, wherein the encrypted data includes the edit to the portion of the document that is encrypted based on a data encryption key, and the data encryption key that is encrypted by a second server based on a key encryption key for transmission to the first server; and
providing the encrypted data to the first server that is unable to decrypt (i) the document in the encrypted form, (ii) the encrypted edit to the portion of the document and (iii) the encrypted data encryption key.

18. The method of claim 17, wherein the generating of the encrypted data comprising:

generating the data encryption key;
encrypting the edit based on the data encryption key;
providing the data encryption key to the second server;
obtaining the encrypted data encryption key generated based on encryption of the data encryption key using the key encryption key; and
combining the encrypted edit with the encrypted data encryption key to generate the encrypted data.

19. The method of claim 17, further comprising:

receiving second encrypted data from the first server of the cloud-based storage system, the second encrypted data representing a second edit to the portion of the document made by a collaborator of the document, wherein the second encrypted data includes the second edit encrypted based on a second data encryption key, and the second data encryption key encrypted based on the key encryption key;
obtaining the second edit from the second encrypted data by decrypting the encrypted second data encryption key using the key encryption key and decrypting the encrypted second edit using the decrypted second data encryption key; and
updating the document provided on the GUI based on the second edit.

20. The method of claim 19, further comprising:

receiving third encrypted data from the first server of the cloud-based storage system, the third encrypted data representing a third edit to the portion of the document made by another collaborator of the document;
generating fourth encrypted data based on a combination of the second edit and the third edit in a chronological order; and
providing the fourth encrypted data to the first server of the cloud-based storage system.

* * * * *